United States Patent
Shmuylovich et al.

(10) Patent No.: US 7,681,011 B1
(45) Date of Patent: Mar. 16, 2010

(54) METHODS AND APPARATUS FOR PARTITIONING MANAGEMENT INFORMATION

(75) Inventors: Samuil Shmuylovich, Framingham, MA (US); Anoop George Ninan, Milford, MA (US); Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 856 days.

(21) Appl. No.: 11/393,641

(22) Filed: Mar. 30, 2006

(51) Int. Cl.
*G06F 12/00* (2006.01)
(52) U.S. Cl. ...................... 711/173; 711/114
(58) Field of Classification Search ................ 711/170, 711/173, 156, 154, 162, 161, 165, 203, 202; 714/4, 6; 709/223, 224
See application file for complete search history.

(56) References Cited

U.S. PATENT DOCUMENTS

| | | | | |
|---|---|---|---|---|
| 6,892,284 | B2* | 5/2005 | Ling et al. | 711/153 |
| 7,403,987 | B1* | 7/2008 | Marinelli et al. | 709/223 |
| 7,415,586 | B2* | 8/2008 | Mimatsu et al. | 711/162 |
| 2003/0149762 | A1* | 8/2003 | Knight et al. | 709/224 |
| 2005/0010733 | A1* | 1/2005 | Mimatsu et al. | 711/162 |
| 2007/0038679 | A1* | 2/2007 | Ramkumar et al. | 707/200 |
| 2007/0101097 | A1* | 5/2007 | Serizawa et al. | 711/203 |
| 2007/0168336 | A1* | 7/2007 | Ransil et al. | 707/3 |

FOREIGN PATENT DOCUMENTS

JP    2005-031716    *    2/2005

* cited by examiner

*Primary Examiner*—Pierre-Michel Bataille
(74) *Attorney, Agent, or Firm*—Chapin IP Law, LLC (57) ABSTRACT

A SAN management agent performs range based partitioning according to subranges of a set of storage devices. Partitions expressed as a range of storage objects (e.g. storage devices), based on device Ids, rather than static partition labels, allows the partitions to dynamically change to suit a current SAN configuration and number of storage devices in the storage arrays. Typically, management information is in the form of updates to a particular storage object. Accordingly, each update record in an update set is attributable to a device ID of the storage object to which it pertains. Identification of partitions by a range of storage devices allows the update records to be indexed, or grouped, to a particular partition without persisting a fixed partition ID with the data. The device ID range defines a partition that remains a logical quantity which may change upon SAN reconfiguration by avoiding persisting a fixed partition ID to the update records.

15 Claims, 7 Drawing Sheets

METHODS AND APPARATUS FOR PARTITIONING MANAGEMENT INFORMATION

BACKGROUND

In a storage area network (SAN), a SAN management application monitors and manages manageable entities in the SAN. The manageable entities include storage arrays, connectivity devices, and hosts. Typically, software components known as agents execute on the hosts for gathering, reporting, and monitoring the manageable entities in the SAN. The manageable entities are responsive to the agents for reporting various status metrics back to the agents and receiving control information from the agents. A management server executes the SAN management application, and oversees the agents. The management server is responsive to a console having a graphical user interface (GUI) for receiving and displaying operator parameters with a SAN operator.

The SAN is therefore an interconnection of manageable entities operative to provide mass data storage and retrieval services to a user community. In the SAN, various data collection and reporting operations occur via the agents and the manageable entities the agents monitor. The data collection and reporting operations gather management information about the SAN. The management information is indicative of operating parameters, including but not limited to physical device usage, logical device allocation across physical devices, redundancy usage (mirroring, shadowing and RAID arrangements), available storage, used storage and archive/backup arrangements. Other types and usage of management information is employable by those skilled in the art of SAN management and control.

SUMMARY

In a storage area network, an interconnection of manageable entities, including storage arrays, connectivity devices (e.g. switches) and host computers (hosts), provide data storage and retrieval services to a user community. Conventional storage area networks accumulate management information corresponding to ongoing activity in the SAN, typically from processing associated with the storage and retrieval services. The storage area network (SAN) therefore includes a set of storage arrays for storing user data, and an interconnection of manageable entities for retrieving and updating the data in response to user requests. The management information typically includes performance and usage metrics indicative of utilization levels, available storage, and usage demands, for example, and may be employed for tracking usage, planning upgrades, forecasting usage trends and distributing demand loads. The SAN gathers the management information from the agents, which are typically implemented as software processes deployed on various hosts throughout the network.

The agents are therefore responsible for monitoring and managing the various manageable entities in the SAN, and are responsive to the SAN management application for reporting management information and receiving administrative commands. Among the manageable entities in the SAN, the storage arrays include a plurality of storage devices, such as disk drives, each of which is itself a manageable entity and operable to generate management information. In a particular storage array, therefore, there are a plurality of storage devices (or storage objects) that generate management information gatherable by the agents. In a large SAN, the management information gathered by the agents can be substantial, even in a single storage array.

Accordingly, configurations of the invention are based, in part, on the observation that substantial management information gathered by an agent may be cumbersome to process. Further, in a large SAN having many storage arrays and agents, multiple agents may gather similar or related data, possibly at different time intervals. The agents report gathered management information to the server via a store process in the management application for processing and coalescing in a database, such as a managed object database, operable for storing administrative data such as the management information concerning the SAN. Therefore, in a large SAN, it is beneficial to avoid burdening the management application with large data sets that may cause bottlenecks or disproportionate demands on computing resources.

In the SAN, mechanisms for processing large data sets of management information include change sets and partitioning, discussed further in the following copending U.S. patent applications. Change sets and partitions are employed to handle sparse updates and avoid time and resource consuming full data sets, as discussed further in copending U.S. patent application Ser. No. 10/675,205, filed Sep. 30, 2003, entitled "METHOD AND APPARATUS FOR IDENTIFYING AND PROCESSING CHANGES TO MANAGEMENT INFORMATION", and copending patent application Ser. No. 11/393,110 filed concurrently, entitled "METHODS AND APPARATUS FOR PERSISTING MANAGEMENT INFORMATION CHANGES", both incorporated herein by reference in entirety. Conventional partitioning is discussed further in copending U.S. patent application Ser. No. 11/095,421, filed Mar. 31, 2005, entitled "METHOD AND APPARATUS FOR PROCESSING MANAGEMENT INFORMATION", also incorporated herein by reference in entirety. Conventional partitioning identifies a subset, or partition, of a larger data set, and labels the partition accordingly (e.g. 1 of 10, 2 of 10, etc.). The store process may then process incremental partitions, rather than an entire data set, at a particular time to avoid overburdening the store process. Such conventional partitions may be based, for example, on an exemplary or typical data set size, and subdivide the data set accordingly into a particular number of partitions.

In a particular exemplary configuration, a typical data set may be 10K (Kilobytes), and an optimal or ideal partition may be 2K. Accordingly 5 partitions are computed and employed. If the SAN configuration changes to include larger storage arrays, the typical data set may increase, for example, to 20K. Therefore, based on the computed 5 partitions, the partition size increases to 4K exceeding the optimal size by a factor of 2 Conventional partitioning in this manner suffers from the shortcoming that 1) scalability is hindered because the partition sizes grow proportionally with the increased storage, potentially away from a predetermined optimal partition size, and 2) backward compatibility is impeded because partition IDs, or labels, are persisted (stored) with the data, therefore requiring retroactive updating of the entire data set if partition changes are needed, and agent updates as well. The latter occurrence facilitates updating because the updated records may simply be retrieved based on partition ID, however persists this information with the data itself. Therefore, maintaining a fixed number of partitions, or persisting partition Ids with the corresponding data, may hinder either performance and/or backward compatibility upon SAN configuration upgrades.

Dynamic partitioning as disclosed herein allows partition size manipulation in three ways. 1) Operating conditions ma be used to determine an optimal partition size during execution, such as via a throttling or queue monitoring; 2) An optimal partition size may be computed based on prototype and/or beta tests, and set to a fixed size by the agent configurations; and 3) A receiving store process can inform the sending agent of a ceiling indicating how large a partition it may handle, and the agent responds accordingly. In each case, the update records avoid containing and persisting a partition ID with the updated data, thereby relieving the store process from fixed (persisted) partition IDs or labels and growing partition sizes.

Configurations herein substantially overcome configuration issues associated with a fixed or static number of partitions by performing range based partitioning of management information. Partitions expressed as a range of storage objects (e.g. storage devices) are operable to handle a SAN configuration modification, such as changing or upgrading storage arrays to increase storage, by dynamically responding to changes in the number of storage devices in the storage arrays. Typically, management information is in the form of update records, or records, to a particular storage object. Accordingly, each update record is attributable to a device ID of the storage object to which it pertains. Identification of partitions by a range of storage devices allows the change records to be indexed, or grouped, to a particular partition without persisting a fixed partition ID with the data. Since the device ID is typically a static value, the ranges of the partitions remains dynamic while the update record retains the same device ID. In this manner, the device ID range defining a partition remains a logical quantity which will dynamically adapt SAN reconfiguration by avoiding persisting a fixed partition ID to the change records.

In further detail, the method of partitioning data in a storage area network as disclosed herein includes identifying a set of updates, or management information records, indicative of change information in a storage array, in which the storage array includes a plurality of storage objects, and identifying, for each of the updates, a storage object to which the updates correspond. An agent computes a subset (partition) of the storage objects in the storage array, and determining, for each of the identified updates, if the updates correspond to the computed subset of storage objects. Computing the subset of storage objects includes identifying a range of storage objects in the storage array, and enumerating, from the identified range, subranges of storage objects in the storage array, such that each of the subranges defines a consecutive sequence of storage objects. In the exemplary configuration, the storage objects are storage devices manageable as manageable objects from a SAN management application.

In the exemplary arrangement, each of the enumerated subranges defines a partition, such that enumerating the subranges further includes determining a series of partitions, the partitions subdividing the range of storage objects, the series of partitions collectively inclusive of each of the storage objects in the storage array. The agent determines corresponding updates by computing, for each of the determined partitions in the series of partitions, a partition set including the set of updates (management information records) corresponding to the storage objects in the partition, and transmitting the update set for each of the partitions independently of the other partitions in the series of partitions.

The agents, therefore, in the exemplary configuration discussed herein, identify a range of storage objects in a storage array, and define a partition inclusive of a subrange of the storage objects in the storage array. An agent receives each change in the set of updates, such that each change corresponds to a particular storage object, or storage device in the storage array, and determines, for each of the updates, the storage object to which the change corresponds. The agent identifies the change as corresponding to a particular partition based on the storage object to which that change corresponds.

In the exemplary arrangement, each of the agents determines a set of updates to a data set stored at the storage array, and computes, for each of the updates, a corresponding partition based on the identity of the storage device to which the change was made. The agent demarcates the set of updates into a series of partitions based on the computed partition for each change.

In the exemplary configuration, the agent computes a threshold indicative of a need to partition, and determining if the number of updates to the data set exceeds the computed threshold. The agent continues partitioning the updates by subdividing the updates into the corresponding partitions, transmits each of the partitions independently of the other partitions.

In the particular configuration disclosed herein, each of the agents are responsive to the management application, such that computing the subranges further includes identifying a total range of storage objects, in which the storage objects are storage devices in a storage array, and each of the storage objects is referenced by a device ID and the identity of the storage array. The agent receives or computes a partition size and allocates appropriate subranges of storage devices of the total range to compute a plurality of subranges meeting the desired partition size. As indicated above, partition sizes maybe fixed by configuration, reported from the store process, or computed based on resource factors. In particular arrangements, the agent defines the limit, or range, of the subrange by a specification of sequential identifiers indicative of the corresponding storage devices; alternatively, the store process computes or reports a computed or optimal size, and the agent determines a corresponding range. Partition size may therefore be determined via collaboration between the agent and the store process, as well as other factors. Therefore, identifying the partition further includes identifying a top level manageable entity, the top level manageable entity inclusive of other manageable entities, and identifying a set of manageable entities included in the top level manageable entity, each of the set of manageable entities having an object ID. The agent identifies partitions by an upper and lower bound of the object ID of the subrange of the set of manageable entities, which in the exemplary configurations are storage devices in the storage array.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein substantially overcome configuration issues associated with a fixed or static number of partitions by performing range based partitioning. Partitions expressed as a range of storage objects (e.g. storage devices), based on device Ids, rather than static partition labels, allows the partitions to dynamically change to suit a current SAN configuration and number of storage devices in the storage arrays. Typically, management information is in the form of updates to a particular storage object. Accordingly, each update record in an update set is attributable to a device ID of the storage object to which it pertains. Identification of partitions by a range of storage devices allows the update records to be indexed, or grouped, to a particular partition without persisting a fixed partition ID with the data. Since the device ID is typically a static value, the ranges of the partitions remains dynamic while the update record retains the same device ID. In this manner, the device ID range defining a partition remains a logical quantity which may change upon SAN reconfiguration by avoiding persisting a fixed partition ID to the update records.

In a storage area network, management information is gathered by techniques such as those disclosed in copending U.S. patent application Ser. No. 11/393,110, cited above. In such a SAN, each storage array, such as a Symmetrix storage array, includes a plurality of storage devices. The storage devices are typically indexed by a device ID, such as a 4 digit hex quantity, although any suitable index may be employed. In the exemplary configuration, the storage arrays are Symmetrix storage arrays, marketed commercially by EMC corporation of Hopkinton, Mass., assignee of the present application. The Symmetrix ID and device ID uniquely identifies a particular storage device in the SAN. Accordingly, defining partitions as a subrange of devices within a storage array denotes a unique partition within the SAN, since a storage array ID and storage device ID uniquely identify the storage device.

Figure 1:
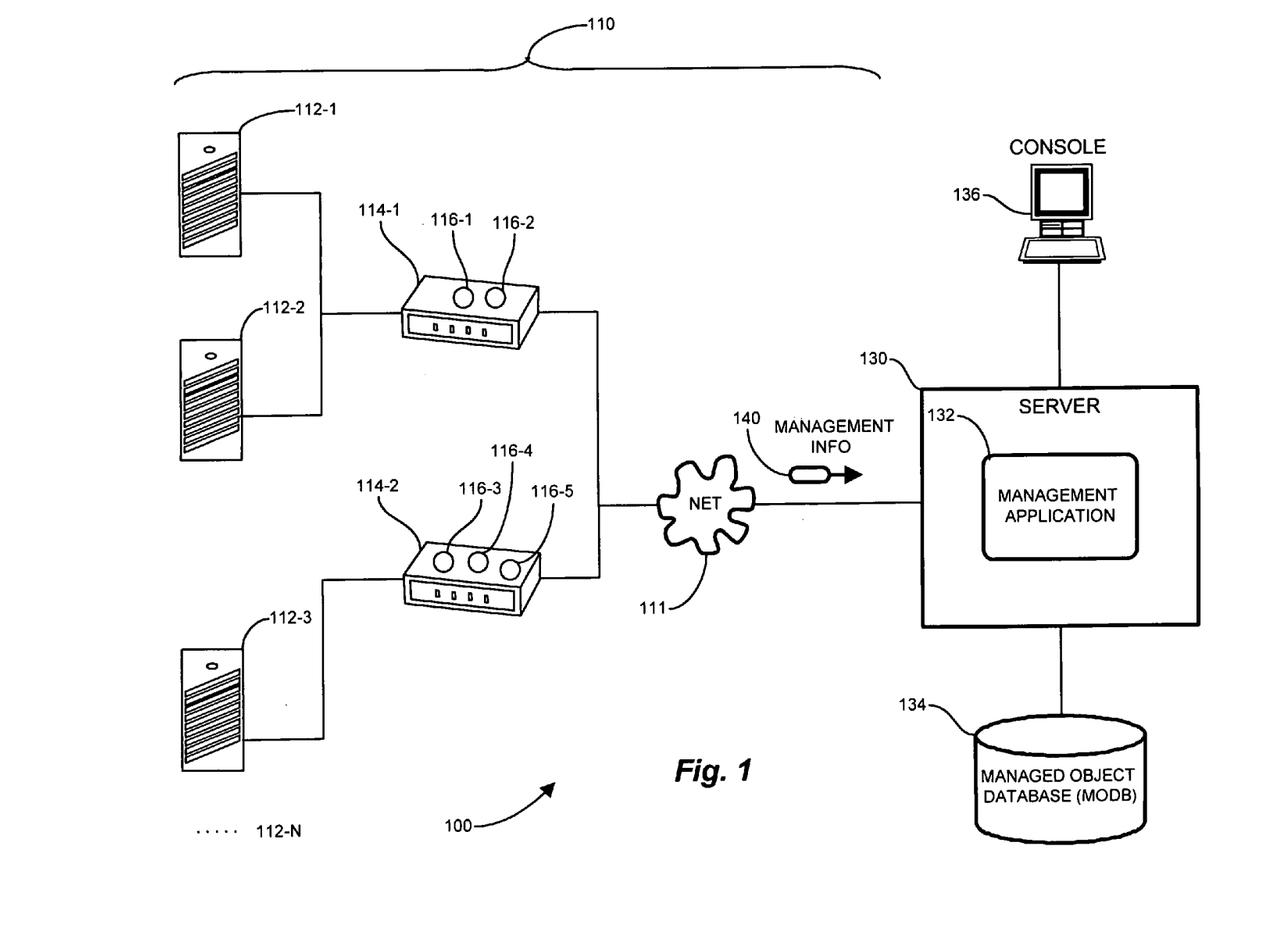
FIG. 1 is a context diagram of an exemplary managed information environment suitable for use with the present invention.

FIG. 1 is a context diagram of an exemplary managed information environment 100 suitable for use with the present invention. Referring to FIG. 1, the environment includes a storage area network 110 interconnecting manageable entities. The manageable entities include storage arrays 112-1 ... 112-N (112, generally), for storing user data, and host computers 114-1 ... 114-2 (114 generally) for transporting user data via the SAN 110 and gathering management information 140 about the SAN. In particular, the host computers 114 (hosts) connect to particular storage arrays and execute agents 116-1 ... 116-5 (116 generally) for gathering management information. The agents 116 are software processes operable to gather particular types of data from specific devices, such as the storage arrays 112, to which they connect. In the exemplary configuration, as indicated above, the storage arrays 112 may be Symmetrix storage arrays, marketed commercially by EMC corporation. Alternate configurations may include other devices such as different type of storage arrays or manageable entities.

The agents 116 gather management information for transmission to a management application 132 executing on a server 130 via a network 111, which may be included in the storage area network 110. The management information 140 includes administrative data pertaining to the storage arrays 112, such as usage metrics (available, allocated and free storage), access frequency and volume, user access trends, and other data pertinent to performance, availability and capacity of the respective storage arrays. A managed object database 134 connects to the server 130 for storing the management information 140, and a user console 134 also connects to the server 13o for invoking the management application 132 to provide reports and other output from the stored management information 140. In this manner, a SAN operator may employ the console 136 to gather reports concerning the health and performance of particular storage arrays over time from the management information 140 stored in the managed object database 134.

Figure 2:
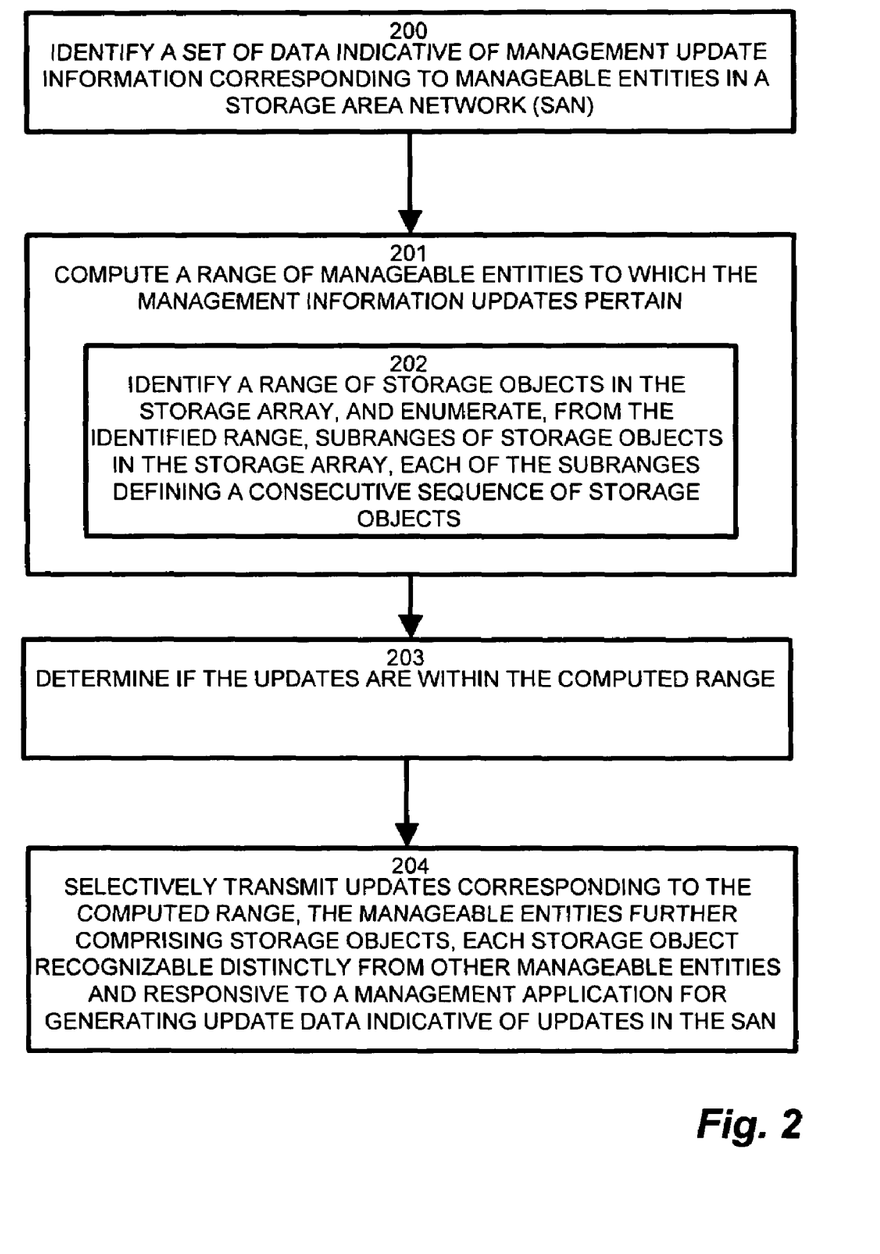
FIG. 2 is a flowchart of database partitioning in the environment of FIG. 1.

FIG. 2 is a flowchart of database partitioning in the environment of FIG. 1. Referring to FIGS. 1 and 2, the method of partitioning data in a storage area network (SAN) as disclosed herein includes, at step 200, identifying a set of data indicative of update information corresponding to manageable entities in a storage area network (SAN). The update information may be in the form of a full set of data or a change set (relative), as described in the copending patent cited above, and includes update records of management information corresponding to a particular storage device (storage object). It should be noted that change set processing, as discussed in the copending application cited above, is independent from partitioning as discussed herein, and is employable in conjunction with, or separate from, such change set processing. Prior to partitioning the update information (i.e. management information 140), the agent 116 computes or receives a range of manageable entities (i.e. storage arrays 112) to which the updates pertain, as depicted at step 201, thus identifying the available storage devices in the storage array 112 that the management information 140 concerns. Typically the range is a sequential set of device identifiers (IDs), which in the exemplary configuration is a four digit hex value. From the identified range of storage objects in the storage array 112, the partitioner enumerates, from the identified range, subranges of storage objects in the storage array 112, in which each of the subranges define a consecutive sequence of storage objects, as shown at step 202. Each of the subranges is a partition, and the full set of partitions defines the storage devices included in a particular storage array 112. The partitioner therefore effectively performs segregation on the management information to partition the data.

For each update record in the management information 140 (i.e. set of updates representing management information transmitted from an agent 116), a partitioner 118 determines if the updates are within the computed subrange of a particular partition, as depicted at step 203, until computing the partition into which the updates should be placed. Typically partitioning is an iterative process, grouping the updates according to particular sets (partitions) of storage devices, also referred to as segregation, discussed further below. The agent 116 selectively transmits updates corresponding to the computed range (i.e. partition), for each partition, until all partitions corresponding to the storage array 112 are transmitted to the management application 132, as depicted at step 204. In the exemplary configuration, manageable entities 112 corresponding to each partition further include storage objects, in which each storage object is recognizable distinctly from other manageable entities and responsive to the management application 132 for generating update data indicative of changes in the SAN (i.e. a particular disk drive in the storage array)

Figure 3:
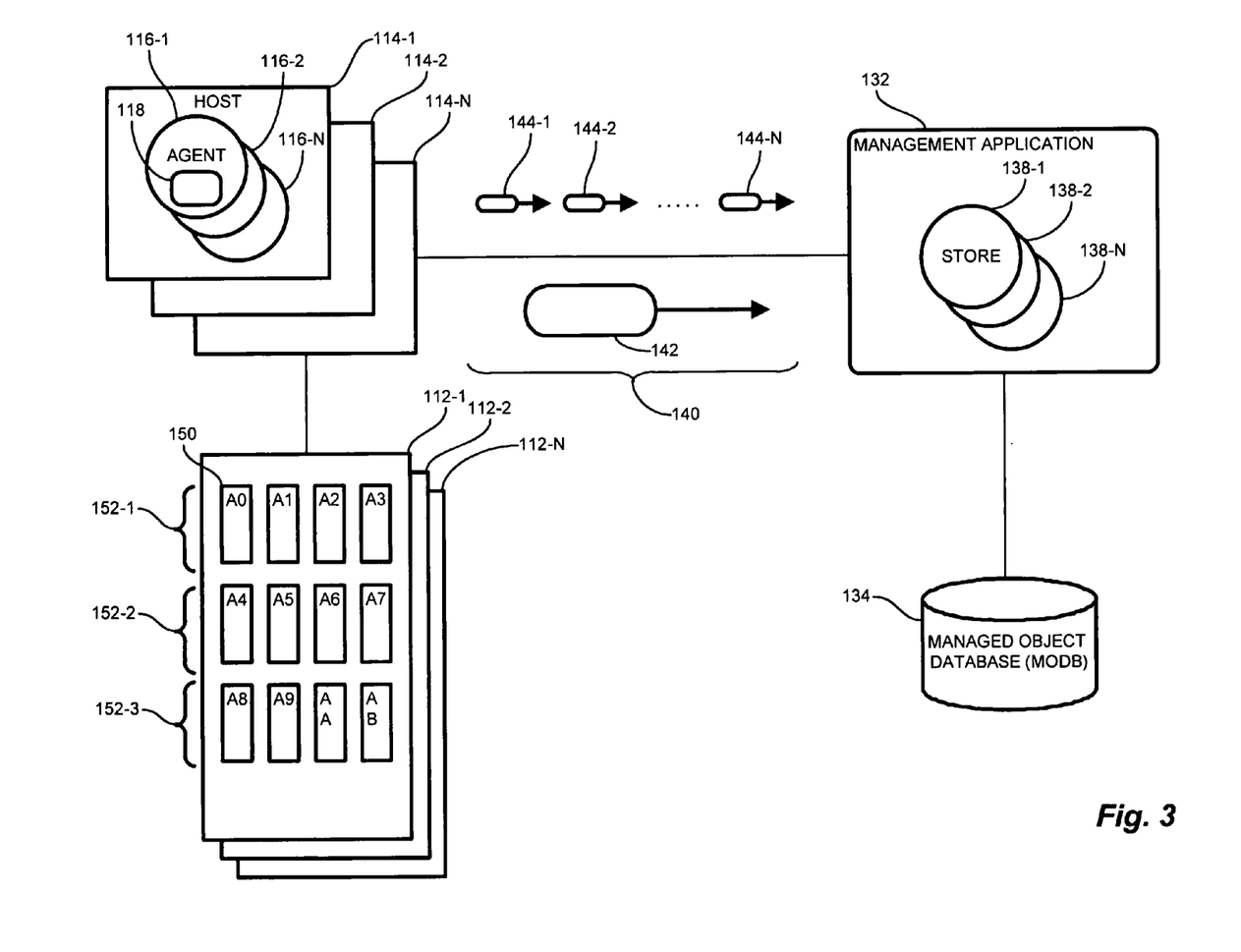
FIG. 3 illustrates an example configuration of an agent and a store process in accordance with a particular exemplary embodiment used illustratively herein for transmitting partitions.
Figure 4:
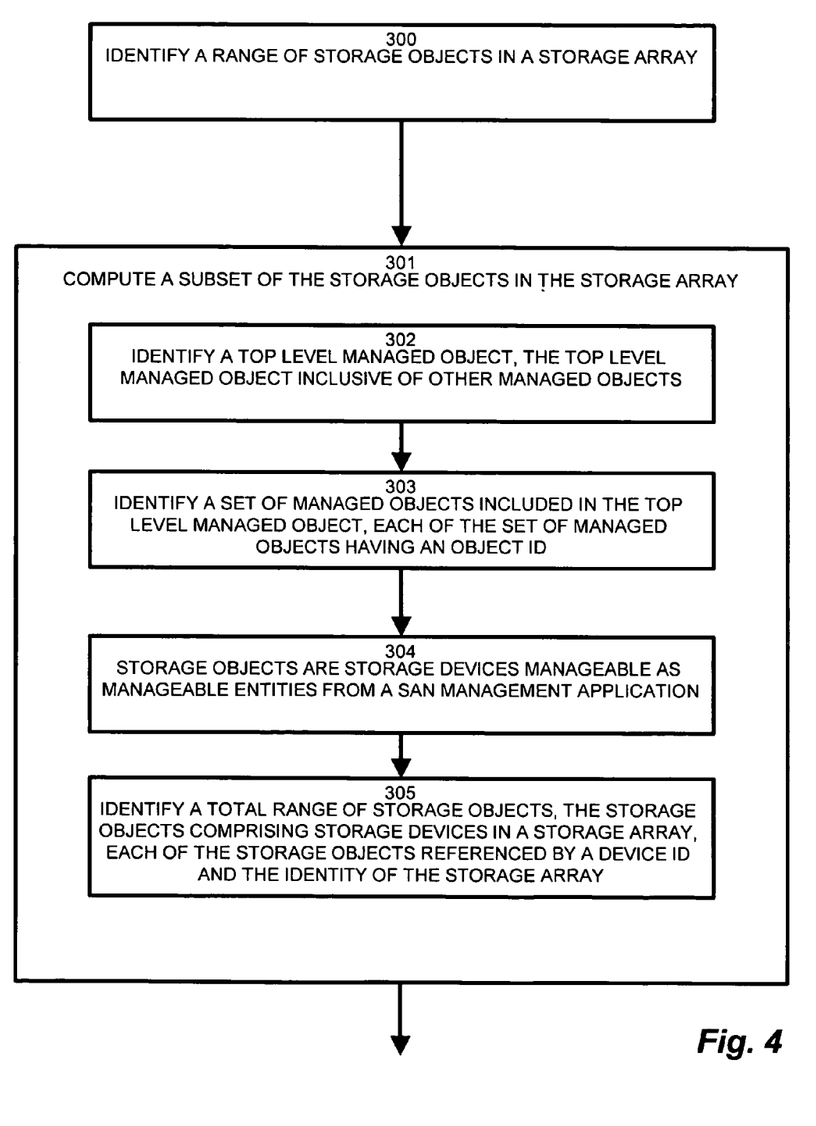
FIGS. 4-7 are a flowchart of partitioning in the configuration of FIG. 3.
Figure 5:
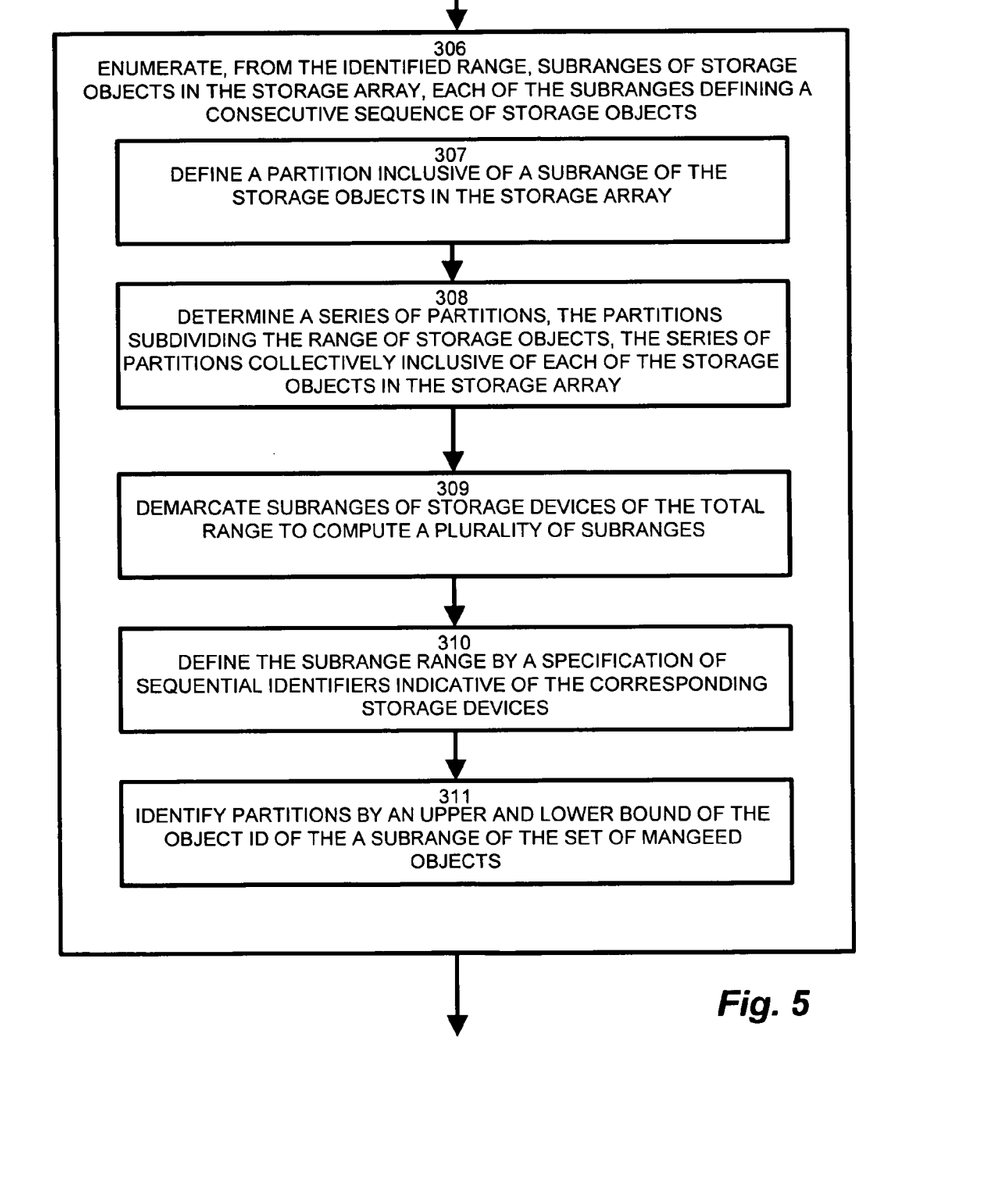
Figure 6:
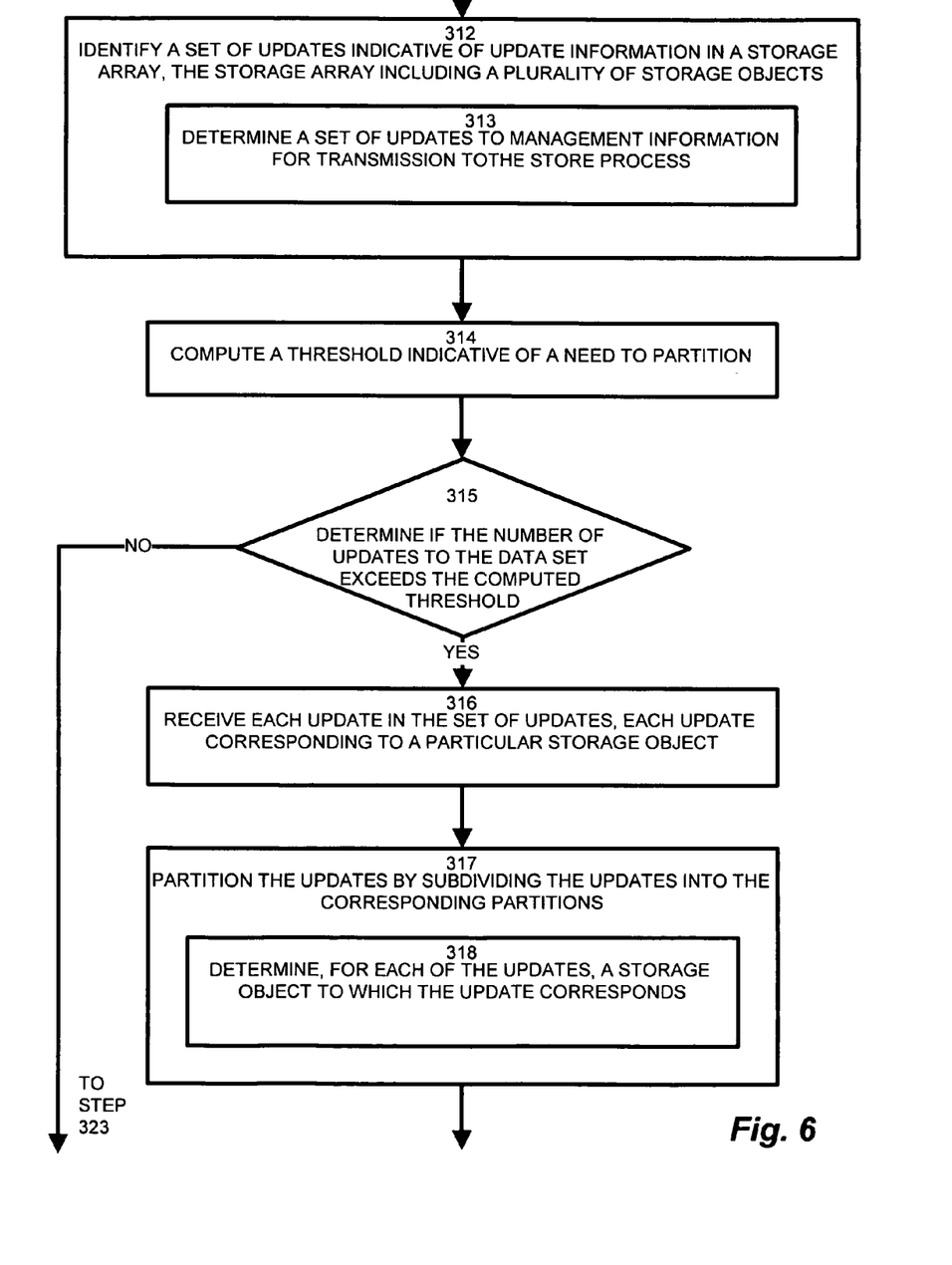
Figure 7:
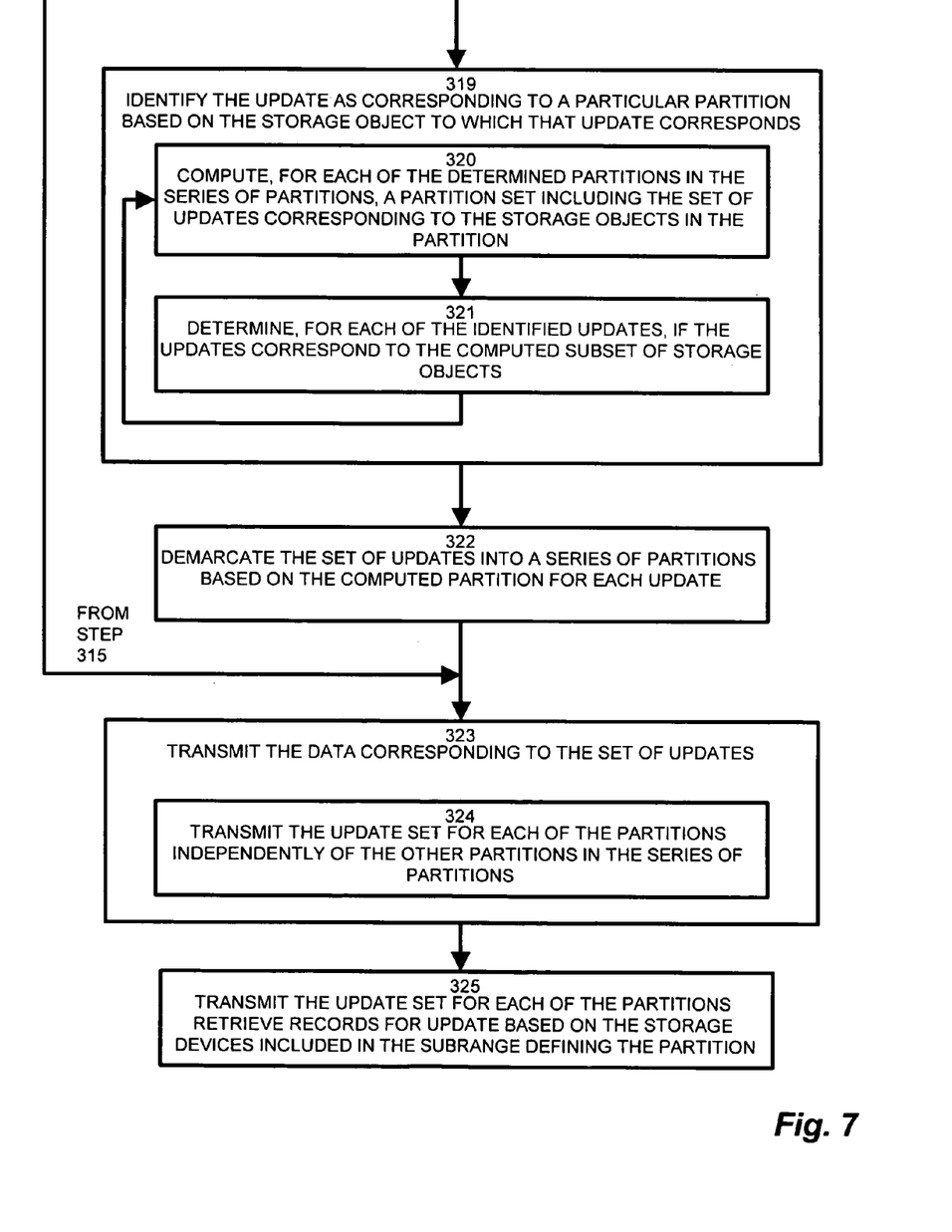

FIG. 3 illustrates an example configuration of an agent 116 and a store process in accordance with a particular exemplary embodiment used illustratively herein for transmitting partitions 144. Referring to FIGS. 1 and 3, the exemplary configuration includes a plurality of agents 116-N on a plurality of hosts 114-N gathering management information 140 for each of a plurality of storage arrays 112. Generally, therefore, each storage array 112 is responsive to at least one agent 116 for gathering management information 140. The management application 132 has one or more store processes 138-1 . . . 138-N (138 generally) for receiving gathered management information 140 from the agents 116. As indicated in the copending applications cited above, it is beneficial to meter or throttle the management information 140 sent from the agents 116 to avoid burdening or queuing excessive amounts of management information 140 at the store process 138.

Accordingly, configurations herein format and transmit the management information in partitions 144-1 . . . 144-N. The management information 140 includes updates to a particular storage device 150 within a storage array 112. Each partition 144 includes a subset of updates, or records, included in a set of management information 140, typically representative of an entire storage array 112. Therefore, agents 116 examine the quantity, or size, of the management information 140, and determine whether to send a single data set 142 or a series of partitions 144, each including a subset of the management information 140.

Each of the storage arrays 112 from which agents 116 gather management information includes a plurality of storage devices 150-1 . . . 150-N (150 generally), which in the exemplary configuration are disk drives. Alternatively, other storage objects may be employed as storage devices, such as non-mechanical memory arrangements (e.g. flash memory). The management information 140 includes updates corresponding to a particular storage device 150. Accordingly, the updates may be organized according to the storage device 150 to which they correspond. A partitioner 118 in the agent 116 groups the updates according to a subset, or partition 144, of storage devices 150 including the updates to that subset of storage devices 150. The agents 116 transmits the updates corresponding to a particular subset of storage devices 150 as a partition 144. The partitioner 118 subdivides the storage devices 150 in the storage array 112 into predetermined partition groups 152-1 . . . 152-3, each including a subset of storage devices 150, thus performing segregation of the management information into partitions. In the exemplary arrangement, the storage devices have consecutive device identifiers A0H . . . ABH and the partitions represent a subset of sequential storage devices 150 in the storage array 112. The partitions 144 are denoted as a sequence of consecutive storage devices 150 in the storage array, therefore a device ID of the lower and upper bound (limits) of the sequence identifies the partition 144. The partitioner may employ alternate grouping mechanisms to denote the storage devices included in a partition, such as an enumerated list of device IDs, for example. In the exemplary configuration, partitions are denoted by hexadecimal identifiers A0 . . . AB, each including four storage devices 150. Hence, three partitions A0 . . . A3 (152-1), A4 . . . A7 (152-2) and A8 . . . AB (152-3) are shown. The management information 140 gathered by the agent 116-1 with respect to the storage devices A0-AB is partitioned by the partitioner 118 into partitions 144 labeled "00A0 . . . 00A3", "00A4 . . . 00A7" and "00A8 . . . 00AB". Note that in the exemplary configuration, the partition label includes a four digit hex identifier denoting the storage device ID of the lower and upper storage devices in the subrange denoted as the partition group 152. The exemplary storage array 112 shows an illustrative 12 storage devices 150. In a typical storage array 112, many additional storage devices 150 may be available, designated as device IDs 0000-FFFF (2^16 devices) in an exemplary configuration. Alternate configurations may employ alternate range specifications, to accommodate a larger range of storage devices 150, for example.

Upon receipt by the store process 138, the identifiers (4 digit hex labels) corresponding to the device IDs are employed to retrieve the management information records for update. In the exemplary configuration, a SQL (Structured Query Language) syntax is employed for accessing he managed object database (MODB) 134. In other words, the store process retrieves records based on the storage device IDs in the range of the partition. Alternate storage and retrieval indices may be employed in other configurations. Upon receiving a partition 144, the store process 138 queries the MODB 134 specifying the device IDs in the range called for by the partition ID. In contrast, conventional partitions format a SQL query targeting the partition ID, already stored with the desired records.

FIGS. 4-7 are a flowchart of partitioning 144 in the configuration of FIG. 3. Referring to FIGS. 3-7, at step 300, the agent 116 identifies a range of storage objects 150, such as storage devices 150, in a storage array 112. The partitioner 118 computes a series of subsets (e.g. partition groups 252) of the storage objects 150 in the storage array 112, collectively representing the identified range A0 . . . AB, as shown at step 301. Computing the subset 152 of storage objects 150 further includes identifying a top level managed object, or manageable entity, such as the storage array 112, in which the top level managed object is inclusive of other managed objects, such as the storage devices, as shown at step 302. In the SAN 110, a manageable entity is any of the various types of devices reportable to or manageable from the management application 132. Some manageable entities are inclusive of other manageable entities, for example storage objects 150 (devices) in a storage array 112. The partitioner 118 identifies a set of manageable entities included in the top level managed object, in which each of the set of manageable entities has an object ID, as depicted at step 303. The object ID uniquely identifies the storage object 150 within the storage array 112, and is a 4 digit hex quantity, described above, in the exemplary arrangement. Further, in the exemplary arrangement, the storage objects 150 are storage devices manageable as manageable entities from the SAN management application 132, as shown at step 304. Therefore, in the exemplary configuration, the partitioner 118 identifies a total range A0 . . . AB of storage objects 150, in which the storage objects 150 are storage devices in a storage array 112, such that each of the storage objects may be referenced by a device ID and the identity of the storage array, as depicted at step 305.

The partitioner 118 is operable to define the series of partitions 144 representing all of the storage objects 150 in the storage array 112 from the identified subranges of storage object. The partitioner 118 partitions based on an optimal or near optimal number of updates included in the respective partitions 144. As indicated above, the subranges of storage objects 150 in a partition is dynamic so as to remain responsive to configuration changes in the SAN 110. The partitioner 118 enumerates, from the identified range A0-AB, subranges 152 of storage objects in the storage array 112, such that each of the subranges defines a consecutive sequence of storage objects 150, as depicted at step 306. Alternatively, a list of storage objects 150 may be employed, however the consecutive range facilitates subrange identification. The partitioner 118 defines a partition inclusive of a subrange of the storage objects in the storage array, as depicted at step 307, for each of the subranges in the storage array. Therefore, each of the enumerated subranges defines a partition 144, such that the partitioner 118 determines a series of partitions 144-1 . . . 144-N. The partitions 144 subdivide the range A0 . . . AB of storage objects 150, and the series of partitions 144-1 . . . 144-N is collectively inclusive of each of the storage objects 150 in the storage array 112, as disclosed at step 308.

In the exemplary configuration, the partitioner 118 demarcates subranges 152 of storage devices 150 of the total range to compute a plurality of subranges 152, as depicted at step 309. The resultant partitions 144, therefore, may have a similar size so as to impose similar processing demands on the store process 138 to which they are sent, although the sizes of individual partitions may vary. Further, the partitioner 118 defines the subrange 152 by a specification of sequential identifiers (i.e. A0 . . . AB) indicative of the corresponding storage devices 150, as depicted at step 310. Partitions 144 may therefore be specified by the device IDs of the storage objects 150 they are inclusive of. This is performed by identifying partitions by the upper and lower bound (limits) of the object ID of the subrange of the set of manageable entities, as shown at step 311. Accordingly, the consecutive sequences defining the subranges 152 allow the corresponding partition 144 to be specified by the upper and lower limit. In the exemplary configuration, the partition may be specified by the 4-digit hex identifier of the respective high and low addressed storage devices as denoted by the device IDs.

After the agent 116 defines and identifies the partitions 144 to employ, the method of partitioning data as defined herein further includes identifying a set of updates indicative of update information in the storage array 112, in which the storage array includes a plurality of storage objects 150, as depicted at step 312. The updates are typically management information 140 updates to the managed object database 134 used for maintaining an accurate picture of SAN 110 usage and performance. The managed object database (MODB) 134 is used buy a SAN operator for generating reports of the management information 140 at the console 136. In the exemplary configuration, the partitioner 118 determines a set of updates to management information at the storage array, as shown at step 313. The partitioner computes a threshold indicative of a need to partition, as shown at step 314. Partitioning is employed for large data sets where the full transmission of the entire set of updates may be unduly burdensome for the store process 138 to accommodate. A check is performed, at step 315, to determine if the number of updates to the data set exceeds the computed threshold.

If the computed threshold is exceeded, partitioned transmission of the management information 140 is appropriate. Accordingly, the partitioner 118 receives each update in the set of updates, in which each update corresponds to a particular storage object 150, as depicted at step 316. The partitioner 118 partitions the updates by subdividing the updates into the corresponding partitions 144 according to the storage object 150 to which the update applies, as shown at step 317. This includes determining, for each of the updates, a storage object 150 to which the update corresponds, as depicted at step 318, and determining which range 152 that storage object 150 falls into. Since the store process 138 does not employ the partition 144 as a label or identifier of the data contained therein, the number and size of the partitions is not employed in computations by the store process 138, only the updates included in the partitions are processed. In this manner, the partition 144 is a portion of the set of updates which is seen as a homogeneous collection of management information 140 by the store process 138.

Upon gathering the set of updates from the storage array 112, the partitioner 118 identifies each of the updates as corresponding to a particular partition 144-N based on the storage object 150 to which that update corresponds, as disclosed at step 319. Thus, the partitioner 118 determines, for each of the identified updates, if the updates correspond to each of the computed subset of storage objects computed as the ranges 152 of the partitions 144, as shown at step 320. Accordingly, the partitioner 118 computes, for each of the determined partitions 144 in the series of partitions 144-1 . . . 144-N, a partition set 144 including the set of updates corresponding to the storage objects 150 in the partition range 152, as depicted at step 321, and iterates back to step 320 for each partition in the set of updates corresponding to the storage array, thus placing each update in an appropriate partition similar to so-called bins often employed for statistical processing.

Upon selecting a partition 144 for each update in the set of updates, the partitioner 118 demarcates the set of updates into a series of partition messages 144-N based on the computed partition for each update, as depicted at step 322. Continuing from step 315, if no partitioning occurs, the agent 116 transmits the data including to the set of updates, as shown at step 323. In each respective case, either the set of partition messages 144-1 . . . 144-N or the full set 142 of the set of updates to management information 140 is sent to the store process 138 by the agent 116. The agent 116 transmits the updates for each of the partitions 144 independently of the other partitions in the series of partitions 144-1 . . . 144-N, as depicted at step 324. Therefore, each of the partitions 144-1 need not maintain a state or context with respect to the other partitions, and is independent of the identity of the partition 144-N with which the update was sent (i.e. 1 of 10, 2 of 10, etc.). The receiving store process retrieves records for update based on the storage devices included in the subrange defining the partition, as depicted at step 325. Note further that such partitioning is independent of processing the updates as a relative (change) set or full data set, as disclosed in the copending application entitled "METHODS AND APPARATUS FOR PERSISTING MANAGEMENT INFORMATION CHANGES" Ser. No. 11/393,110, cited above. Partitioning and change set decisions are independently computed, and may be combined and/or employed separately with a particular set of updates.

Those skilled in the art should readily appreciate that the programs and methods for partitioning management information updates as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for partitioning management information updates has been particularly shown and described with references to embodiments thereof, it will be understood by those skilled in the art that various changes in form and details may be made therein without departing from the scope of the invention encompassed by the appended claims.

What is claimed is:

1. A method of partitioning data comprising:
   identifying a set of updates indicative of updated management information in a storage array, the storage array including a plurality of storage objects;
   identifying, for each of the updates, a storage object to which the updates correspond;
   computing a subset of the storage objects in the storage array;
   determining, for each of the identified updates, if the updates correspond to the computed subset of storage objects;
   updating a SAN managed object database (MODB) using the updates corresponding to the computed subset of storage objects;
   defining a series of partitions inclusive of subranges of the storage objects in the storage array;
   computing a threshold indicative of a need to partition;
   determining if the number of updates to the data set exceeds the computed threshold; and
   transmitting each of the partitions independently of the other partition.

2. The method of claim 1 further comprising:
   identifying a range of storage objects in a storage array;
   receiving each update in the set of updates, each update corresponding to a particular storage object;
   determining, for each of the updates, a storage object to which the update corresponds; and
   identifying the update as corresponding to a particular partition based on the storage object to which that update corresponds.

3. The method of claim 2 wherein identifying the partition further comprises:
   identifying a top level manageable entity, the top level manageable entity inclusive of other manageable entities;
   identifying a set of manageable entities included in the top level manageable entity, each of the set of manageable entities having an object ID; and
   identifying partitions by an upper and lower bound of the object ID of a subrange of the set of manageable entities.

4. The method of claim 2 further comprising:
   determining a set of updates to a data set;
   computing, for each of the updates, a corresponding partition based on the identity of the storage device to which the update was made.

5. The method of claim 4 wherein storage objects are storage devices manageable as manageable objects from a SAN management application.

6. The method of claim 5 wherein computing the subranges further comprises:
   identifying a total range of storage objects, the storage objects comprising storage devices in a storage array, each of the storage objects referenced by a device ID and the identity of the storage array; and
   demarcating subranges of storage devices of the total range to compute a plurality of subranges.

7. The method of claim 6 further comprising:
   defining the limits of the subrange by a specification of sequential identifiers indicative of the corresponding storage devices; and
   retrieving records for update based on the storage devices included in the subrange.

8. A method of partitioning data comprising:
   identifying a set of data indicative of update information corresponding to manageable entities in a storage area network (SAN);
   computing a range of manageable entities to which the updates pertain;
   determining if the updates are within the computed range;
   defining a series of partitions inclusive of subranges of the manageable entities in the storage array;
   computing a threshold indicative of a need to partition; and
   determining if the number of updates to the data set exceeds the computed threshold; and
   selectively transmitting updates corresponding to the computed range, the manageable entities further comprising storage objects, each storage object recognizable distinctly from other manageable entities and responsive to a management application for generating update data indicative of updates in the SAN.

9. A host computer for partitioning management information data in a storage area network (SAN) comprising:
   a computer-readable medium having instructions stored thereon for processing data information, such that the instructions, when carried out by a processing device, enable the processing device to provide an agent operable to identify a set of updates indicative of update information in a storage array, the storage array including a plurality of storage objects;
   a partitioner in the agent operable to
      identify, for each of the updates, a storage object to which the updates correspond;
      compute a subset of the storage objects in the storage array, and determine, for each of the identified updates, if the updates correspond to the computed subset of storage objects;
      identify a range of storage objects in the storage array; and
      enumerate, from the identified range, subranges of storage objects in the storage array, each of the subranges defining a consecutive sequence of storage objects; and wherein the agent is further operable to update a SAN managed object database (MODB) using the updates corresponding to the computed subset of storage objects;

wherein the agent is further operable to:
compute a threshold indicative of a need to partition;
determine if the number of updates to the data set exceeds the computed threshold;
partition the updates by subdividing the updates into the corresponding partitions; and
transmit each of the partitions independently of the other partitions.

10. The host computer of claim 9 wherein each of the enumerated subranges defines a partition, the partitioner further operable to determine a series of partitions, the partitions subdividing the range of storage objects, the series of partitions collectively inclusive of each of the storage objects in the storage array.

11. The host computer of claim 10 where the partitioner is further operable to:
compute, for each of the determined partitions in the series of partitions, a partition set including the set of updates corresponding to the storage objects in the partition; and
transmit the partition set for each of the partitions independently of the other partitions in the series of partitions.

12. The host computer of claim 9 wherein the partitioner is further operable to:
determine a set of updates to a data set;
compute, for each of the updates, a corresponding partition based on the identity of the storage device to which the update was made; and
demarcate the set of updates into a series of partitions based on the computed partition for each update.

13. A host computer for partitioning management information data in a storage area network (SAN) comprising:
a computer-readable medium having instructions stored thereon for processing data information, such that the instructions, when carried out by a processing device, enable the processing device to provide an agent operable to identify a set of updates indicative of update information in a storage array, the storage array including a plurality of storage objects;
a partitioner in the agent operable to
identify, for each of the updates, a storage object to which the updates correspond;
compute a subset of the storage objects in the storage array, and determine, for each of the identified updates, if the updates correspond to the computed subset of storage objects;
identify a range of storage objects in the storage array; and
enumerate, from the identified range, subranges of storage objects in the storage array, each of the subranges defining a consecutive sequence of storage objects; and
wherein the agent is further operable to update a SAN managed object database (MODB) using the updates corresponding to the computed subset of storage objects;
wherein each of the enumerated subranges defines a partition, the partitioner further operable to determine a series of partitions, the partitions subdividing the range of storage objects, the series of partitions collectively inclusive of each of the storage objects in the storage array; wherein the partitioner is operable to compute the partition subranges by:
identifying a total range of storage objects, the storage objects comprising storage devices in a storage array, each of the storage objects referenced by a device ID and the identity of the storage array;
demarcating substantially equal subranges of storage devices of the total range to compute a plurality of subranges; and
defining the limits of the subrange by a specification of sequential identifiers indicative of the corresponding storage devices.

14. A computer program product including a computer readable medium having instructions stored thereon for partitioning data in a storage area network (SAN) for processing data information, such that the instructions, when carried out by a processing device, enable the processing device to perform the operations of:
identifying a set of updates indicative of update information in a storage array, the storage array including a plurality of storage objects;
identifying, for each of the updates, a storage object to which the updates correspond;
computing a subset of the storage objects in the storage array;
determining, for each of the identified updates, if the updates correspond to the computed subset of storage objects;
identifying a range of storage objects in a storage array;
defining a partition inclusive of a subrange of the storage objects in the storage array;
receiving each update in the set of updates, each update corresponding to a particular storage object;
determining, for each of the updates, a storage object to which the update corresponds;
identifying the update as corresponding to a particular partition based on the storage object to which that update corresponds; and
updating a SAN managed object database (MODB) using the updates corresponding to the computed subset of storage objects;
computing a threshold indicative of a need to partition;
determining if the number of updates to the data set exceeds the computed threshold; and
transmitting each of the partitions independently of the other partitions.

15. A computer-readable medium having instructions stored thereon for processing data information, such that the instructions, when carried out by a processing device, enable the processing device to provide a storage area network (SAN) management agent for gathering management information updates from a remote node in a storage area network (SAN) comprising:
means for identifying a set of data indicative of update information corresponding to manageable entities in a storage area network (SAN);
means for computing a range of manageable entities to which the updates pertain, further comprising:
means for identifying a top level manageable entity, the top level manageable entity inclusive of other manageable entities;
means for identifying a set of manageable entities included in the top level manageable entity, each of the set of manageable entities having an object ID; and
means for identifying partitions by an upper and lower bound of the object ID of a subrange of the set of manageable entities;

means for determining if the updates are within the computed range;

means for computing a threshold indicative of a need to partition;

means for determining if the number of updates to the data set exceeds the computed threshold;

means for selectively transmitting updates corresponding to the computed range; and the manageable entities further comprising storage objects, each storage object recognizable distinctly from other manageable entities and responsive to a management application for generating update data indicative of updates in the SAN and for updating a SAN managed object database (MODB) using the updates corresponding to the computed subset of storage objects.

* * * * *